United States Patent

Lueghamer

[11] Patent Number: 5,167,895
[45] Date of Patent: Dec. 1, 1992

[54] METHOD OF MANUFACTURING ELASTIC NUB PANEL PRODUCED THEREBY

[75] Inventor: Albert Lueghamer, Bad Hall, Austria

[73] Assignee: Agru Alois Gruber GmbH, Austria

[21] Appl. No.: 616,346

[22] Filed: Nov. 21, 1990

[30] Foreign Application Priority Data

Jan. 5, 1990 [EP] European Pat. Off. ............ 90100198

[51] Int. Cl.⁵ .................... B29C 43/24; B29C 67/00
[52] U.S. Cl. .................. 264/210.2; 264/571; 264/101; 264/284; 264/310; 264/318; 425/327
[58] Field of Search ................. 264/175, 101, 210.2, 264/284, 293, 294, 318, 571, 310, DIG. 78; 425/325, 327, 382.3, 363

[56] References Cited

U.S. PATENT DOCUMENTS

| | | | |
|---|---|---|---|
| 3,089,191 | 5/1963 | Conrad | 264/175 |
| 3,533,896 | 10/1970 | Hartig | 52/390 |
| 3,635,614 | 1/1972 | Long et al. | 425/325 |
| 3,917,772 | 11/1975 | Hollenbeck | 264/210.2 |

FOREIGN PATENT DOCUMENTS 294507 6/1987 European Pat. Off. .
1102294 5/1955 France .

Primary Examiner—Jeffery Thurlow
Assistant Examiner—Mathieu Vargot
Attorney, Agent, or Firm—Anthony J. Casella; Gerald E. Hespos

[57] ABSTRACT

An extrusion and calendering method is provided to produce a plastic panel, in particular for the lining of concrete containers, having strongly undercut anchoring elements. These protrusions preferably include flat-shaped wings which are arranged approximately V-shaped, forming an angle with and being offset in their width from each other. The leading wing upon the manufacturing process has a smaller angle to the normal through the panel base. The wings may also, differing from the rectangular cross sectional shape described, have a round, oval, elliptical or square cross section.

9 Claims, 2 Drawing Sheets

METHOD OF MANUFACTURING ELASTIC NUB PANEL PRODUCED THEREBY

BACKGROUND OF THE INVENTION present invention refers to a method of manufacturing plastic panels, preferably of thermoplastic resin, which are provided on at least one side with undercut protrusions developed integral with them, the panel blank being shaped by extrusion from a slot nozzle and then conducted through at least one roll nip, one roll of which is provided with recesses corresponding to the projections.

Nub panels of plastic are used, in particular, in the construction of concrete containers when it is desired to construct liquid-tight as well as gas-tight chemically-resistant containers. The plastic panels form the lining of such containers. They produce resistance to chemicals and liquids. The mechanical strength of the overall construction is obtained essentially from the concrete construction. In addition, nub panels of plastic may also be used for the external walls of concrete structures such as in the construction of concrete walls, piles, docks, bridges and the like which are exposed to the elements, such as salt water. Difficulties generally exist in attaching the plastic panels to the concrete structure since the smooth plastic panel does not form a firm mechanical attachment to the concrete. The use of adhesives does not lead to satisfactory results over the long term.

For this reason, various anchoring elements with undercuts have been proposed which are arranged on one side of the plastic panel and are included in the concrete upon the production of the container. In this way, although the desired firm attachment between plastic panel and concrete understructure is obtained, the arranging of the known anchoring elements on the plastic panels is, however, comparatively expensive since it is effected subsequently and requires several operating steps.

Thus, for instance, a method is known from Federal Republic of Germany OS 31 08 972 in which separately produced anchor nubs are placed simultaneously on the plastic panel and fastened to it by welding. This type of application of anchoring nubs is extremely time-consuming in view of the large number of anchoring elements to be applied, or else a correspondingly expensive apparatus is needed. In addition, in the region of their base, these anchoring nubs have sharp-edged transitions in themselves and with respect to the plastic panel, as a result of which notch stresses result with the well-known overstressing.

From French Patent 11 02 294 a method is known by which lining panels are produced by extrusion. Upon the extrusion, anchoring ledges are provided on one side of the panel, determined by the extrusion process, over the entire length of the panel, which ledges may be also undercut. This method can be used only for relatively thick plastic panels in order to assure a uniform development of the anchoring strips. The latter also result in a linear removal of force between the plastic panels and the concrete of the structure. This results in a non-uniform course of the stress in the panel, which reduces its long-time resistance.

Finally, European Patent Application 294 507 describes a method of extruding nub panels in which the nubs of the plastic panel which are produced on a calender must, however, furthermore be conducted through cutting device in order to produce the undercuts which are subsequently to fasten the nub panel in the concrete container. The nub panels produced in this manner are not able to cover all cases of need due to their merely relatively limitedly possible undercuts. Furthermore, the additional operation of the application of the undercuts increases the cost. In addition, special measures must be taken for the removing and collecting of the plastic parts which have been cut off.

OBJECT AND SUMMARY OF INVENTION

The object of the present invention is, therefore, to provide a method of the aforementioned type by which a plastic panel having elements for anchoring in the concrete can be produced in a single operation on a calender, the elements being comparatively large and having sufficient undercuts so that it is possible to cover practically all cases of use which arise in which plastic panels are used for the lining of concrete containers.

This object is achieved in accordance with the invention in the manner that as recesses there are provided in, in each case, at least two partial recesses for wing elements which spread into the inside of the roll from the region of the surface of the roll are provided which extend, not undercut in themselves, into the roll.

It has been found that such protrusions can surprisingly be lifted or pulled out from the recesses of the rolls upon the removal of the plastic panel even though this was not to be expected in view of the undercuts present. This is true, in particular, in the case of the nub or protrusion configuration of the invention, as it is described in further detailed below.

By the method of the invention, one obtains a plastic panel on one side of which protrusions can be provided integrally as later anchoring elements in the concrete. The shape and distribution of these protrusions is determined by suitable arrangement and development of the recesses in the corresponding roll.

The invention also contains proposals for the special development of the protrusions themselves.

BRIEF DESCRIPTION OF THE DRAWINGS

Further details, features and advantages of the invention will become evident from the following description, the diagrammatic drawing and the subordinate claims. In the drawings:

DETAILED DESCRIPTION OF THE PREFERRED EMBODIMENT

Figure 1:
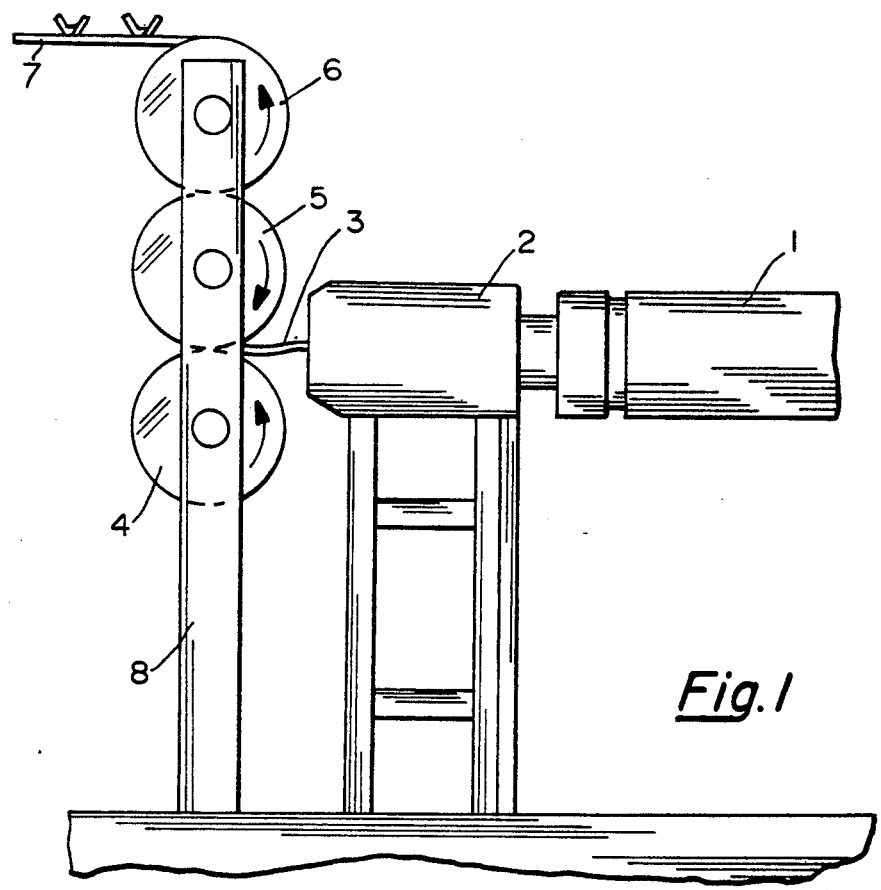
FIG. 1 is a vertical section through a roll stand with extruder in front of it.

FIG. 1 shows diagrammatically the basic known construction of a system for the manufacture of plastic panels. It consists of an extruder having, in front of it, a die 2 which is developed as slot die in order, in this way, to produce a panel blank 3. The latter is introduced into the nip formed by two rolls 4 and 5 and moved around the rolls 5 and 6. The roll 6 is essentially a smoothing roll. A plastic panel 7 with nubs or protrusions in accordance with the invention which is produced basically o the roll 5 is then removed from the roll 6 The web-shaped plastic panel 7 can then be divided and cut in customary manner.

Figure 2:
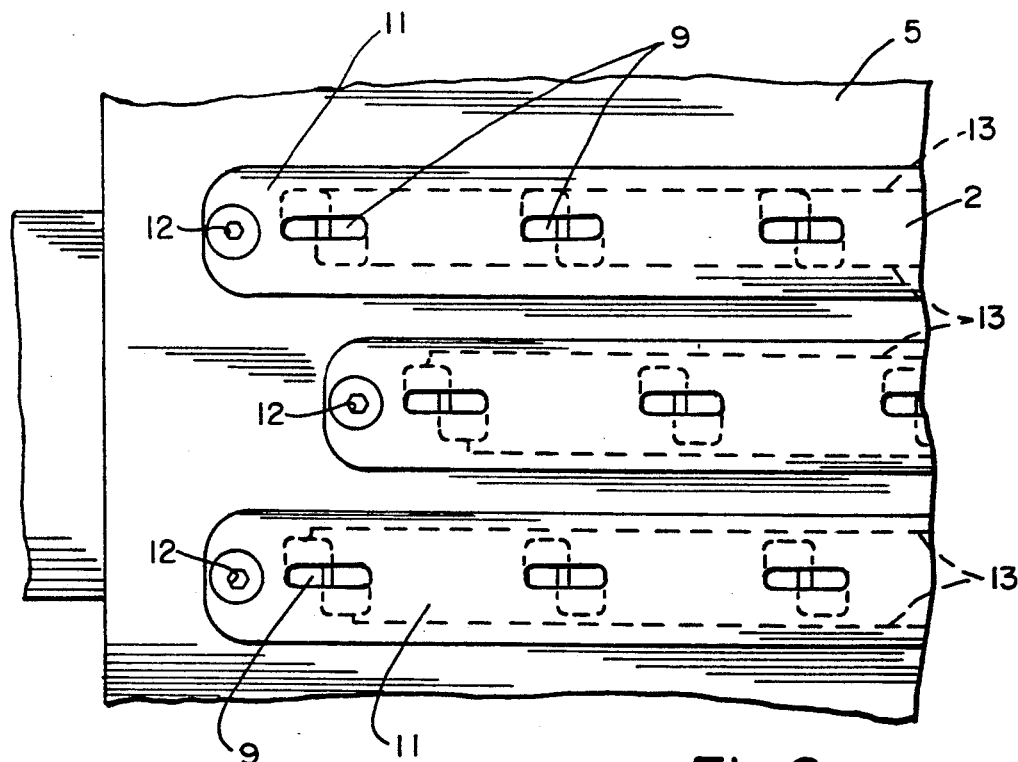
FIG. 2 is a partial front view of the development of the roll of the roll stand which is provided with the recesses for the producing of the protrusions.
Figure 3:
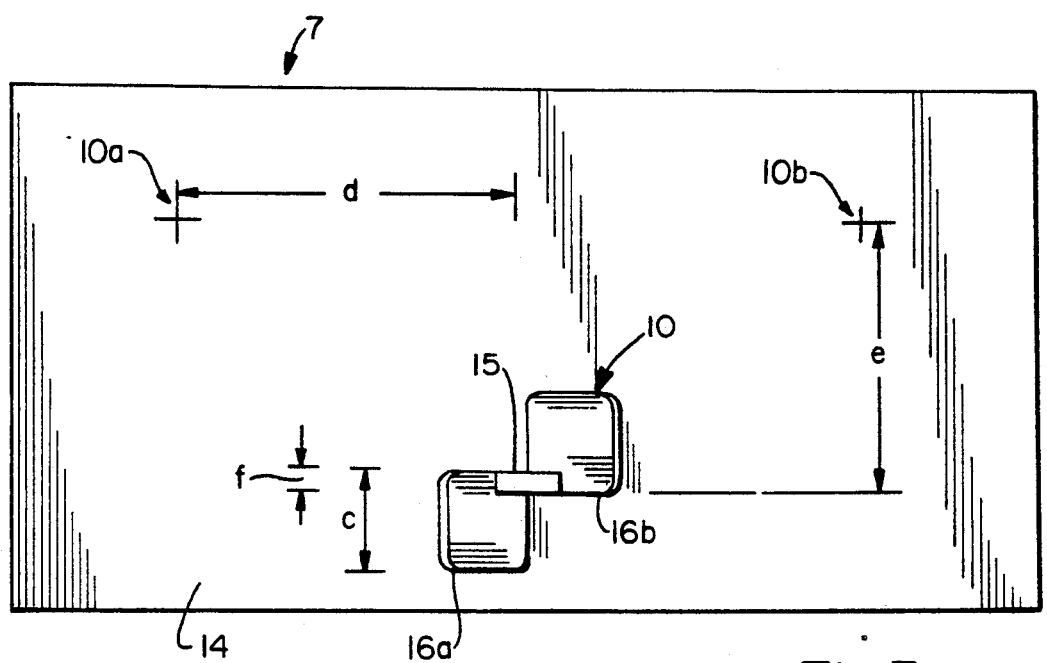
FIG. 3 is a top view of a plastic panel in accordance with the invention, made by the method of the invention.
Figure 4:
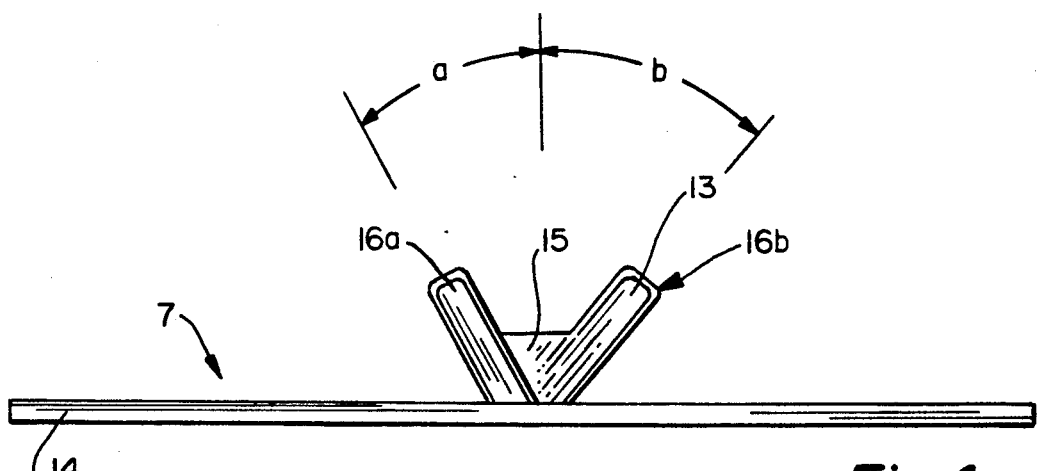
FIG. 4 is a side view of the object of FIG. 3.
Figure 5:
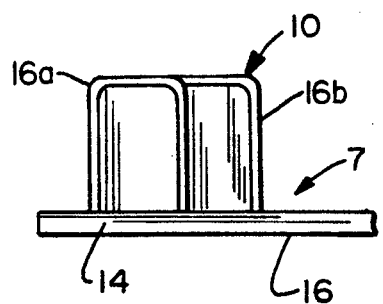
FIG. 5 is a side view of the protrusion of FIG. 4.

In order to produce the plastic panel 7 with protrusions in accordance with the invention, the middle of the three rolls shown of the calender 8 is provided with special recesses distributed over its periphery, as is shown in further detail in FIG. 2, as well as indirectly in FIGS. 3 to 5. FIGS. 3 to 5 show details of the protrusions of a nub panel 7 in accordance with the invention. The recesses in the roll 5 for the producing of these protrusions, however, correspond, of course, to these protrusions.

As can be noted from FIG. 2, recesses 9 for the producing of protrusions 10 are worked into inserts 11 which, in their turn, are recessed in the roll 5 while maintaining a smooth surface, and fastened there by screws 12. The inner ends of the recesses 9 are, in each case, connected to a vent line 13, whereby assurance is had that, upon the penetration of plastic composition into the recesses 9, no back pressure is built up in the recesses 9 and that, therefore, the complete filling of the recesses 9 with the plastic composition is assured. The vent lines 13 are in communication with the atmosphere. They can also be connected to vacuum conduits. The arrangement of the recesses 9 in inserts 11 which, in their turn, are provided in corresponding recesses in the roll 5 serves for a cost-efficient manufacture of this tool. The technically exacting recesses 9 are easier to produce in the more easily handled inserts 11 than would be possible on the comparably large roll 5.

The special development of the plastic panel 7 of the invention will now be discussed in greater detail with reference to FIGS. 3 to 4. The remarks made below with regard to the configuration of the protrusion 10 are, as already mentioned, to be applied in complementary fashion to the recesses 9 in the inserts 11 of the roll 5.

FIGS. 3 to 5 show a preferred embodiment of the plastic panel 1 of the invention, FIG. 1 showing one unit of a protrusion or nub 1 while two further identical protrusions 10a and 10b are indicated in the drawing merely by means of two lines of symmetry. These indicated protrusions 10 a and 10b are identical to the completely shown protrusion or protrusion unit 10.

As can be noted from the said FIGS. 3 to 5, a protrusion 10 extends from a base 14 of the panel 7 and consists of two wings or wing elements 16a and 16b which, in the embodiment shown in FIG. 4, are so arranged with respect to the panel base 14 that their main axes form angles "a" and "b" of 30° and 40° respectively with respect to the perpendicular to the panel base 14. All protrusions 10 are provided in the same manner with respect to the panel base 14. As can be noted in particular from the top view of FIG. 3 and the side view of FIG. 4, a web 15 is arranged in the 70° angular space between the two wings 16a and 16b. The web 15 serves to fix the position of the two wings 16a and 16b with respect to each other, which is advantageous particularly upon the process of removal of the protrusion units 10 from the recesses which have first and second cavities to form the wings, where a certain force must be exerted in order to pull them out of the protrusion or protrusion units 10 in the recesses 9. Furthermore, this web 15, however, is of importance even when the plastic panel 7 of the invention is embedded in concrete if the gravitational forces of the still unhardened concrete act on the wings 16a and 16b there. In this connection also, the webs 15 of the protrusions 16a and 16b assume a stiffening function and thus assure a retention of the undercut overall shape of the protrusions 10 so as to assure a dependable anchoring of the protrusions and thus of the entire plastic panel 7 within the concrete part.

In order to give an idea of the size of the protrusions 10, a few measurements in mm are indicated by way of example in FIG. 3. It Can be noted here that the width C of the wings 16a and 16b is about 11 mm, and the distance "d" between the protrusions—in the direction of the conveyance of the rolls—is 40 mm and the lateral offset "e" between two protrusions is about 29 mm. The width "f" of the web 15 is about 4 mm and the total width "g" of a protrusion unit 10 which is formed of two wings is about 20 mm.

FIG. 3 also shows that the lateral offset of the wings 16a and of a protrusion unit 10 takes place practically over its entire width 1 of 11.3 mm, less the thickness of the web 15. This lateral offset can, however, also be selected smaller but optimum effectiveness of the protrusion unit 10 as anchoring element as well as with respect to removal from the roll 5 of the calender 8 results with the arrangement shown in the drawing. Furthermore, the shape of the wings 16a and 16b is not limited to the flat embodiment shown. The individual wings 16a and 16b can, as seen in cross section, also be of round, oval or square development, in addition to the rectangular shape shown there.

Polyvinyl chloride, polypropylene, polyethylene, polyvinylidene fluoride idene fluoride or E-CTFE enter into consideration as material for the plastic panel 7.

In the case of these plastics, the operating temperatures of the roll 6 are about 90° C. and, in the case of the central roll 5, about 60° C. The speed of removal of the finished plastic panel 7 from the roll 6 is about 10 to 20 meters per hour, depending on the thickness of the panel 7. This relatively low speed of withdrawal is necessary so that the panel base 14 as well as the protrusions 10 can be removed while retaining the form and arrangement which has been described with respect to each other.

The recesses 9 for the wings 16a having the angle of 30° with respect to the vertical to the panel base 14 are arranged in this connection with respect to the recesses 9 for the wings 16b having an angle of 40° in such a manner on the roll 5 that the wings 16a having the angle of 30° lead the wings 16b having an angle of 40°. In this way, dependable removal of the undercut protrusions 10 from the recesses 9 results. At the operating temperatures and speed of operation described, the wings 16a and 16b are still elastoplastic to such an extent that the forces to be exerted on the protrusions 10 upon the removal no longer lead to permanent deformation of the protrusions 10 with respect to the construction described.

I claim:

1. A method for producing a thermoplastic liner for mechanical attachment to substrate, said liner having a base with opposed generally parallel first and second faces and having a plurality of spaced apart nubs projecting unitarily from at least the first face, each said nub comprising a pair of oppositely directed wings projected away from the base and diverging from one another such that the substrate is engageable between portions of the wings and the base, said method comprising the steps of:

providing an extruder with a slot die;

extruding a thermoplastic material through the slot die to produce a generally planar blank of thermoplastic material;

providing a calendar with at least two rolls having rotational axes and defining a nip therebetween, said nip being disposed and dimensioned to receive the blank from the extruder, at least one said roll having a cylindrical surface with a plurality of nub-producing recesses therein, each said recess including an entry slot extended generally parallel to the axis of the roll, and first and second cavities for forming first and second wing extending into the roll and communicating with the associated slot, the cavities diverging from one another such that the first cavity is aligned to a radius of the roll at a first acute angle and such that the second cavity is aligned to the radius of the roll at a second acute angle greater than that of the first acute angle; and rotatably driving the rolls for calendering the blank through the nip such that the first cavity of each recess leads the second cavity into the nip to thereby enable efficient separation of the nubs from the roll.

2. A method as in claim 1, wherein the first angle is approximately 30°.

3. A method as in claim 2, wherein the second angle is approximately 40°.

4. A method as in claim 1, wherein the rolls are rotated to produce the thermoplastic liner at a rate of between approximately 10-20 meters per hour.

5. A method as in claim 1, wherein the roll is maintained at a temperature of approximately 60° C.

6. A method as in claim 1, wherein the thermoplastic is selected from the group consisting of polyvinyl chloride, polypropylene, polyethylene, polyvinylidene fluoride and E-CTFE.

7. A method as in claim 1 further comprising the step of providing a smoothing roller adjacent the first roller, and calendering the liner between the smoothing roller and the first roller for smoothing the side of the liner opposite the nubs.

8. A method as in claim 1, wherein the step of providing a calender comprises providing a nub-producing recess having a web recess extending between the recess ends, and wherein the step of rotatably driving the rolls is operative to produce a web of thermoplastic material extending between the wings of the nub.

9. A method as in claim 1, wherein the step of providing a calender comprises providing a vent communicating with the recesses, and wherein the method further comprises controlling back pressure in the recesses with the vent during calendering of the thermoplastic through the nip between the rolls.

* * * * *